United States Patent Office 2,795,291
Patented June 11, 1957

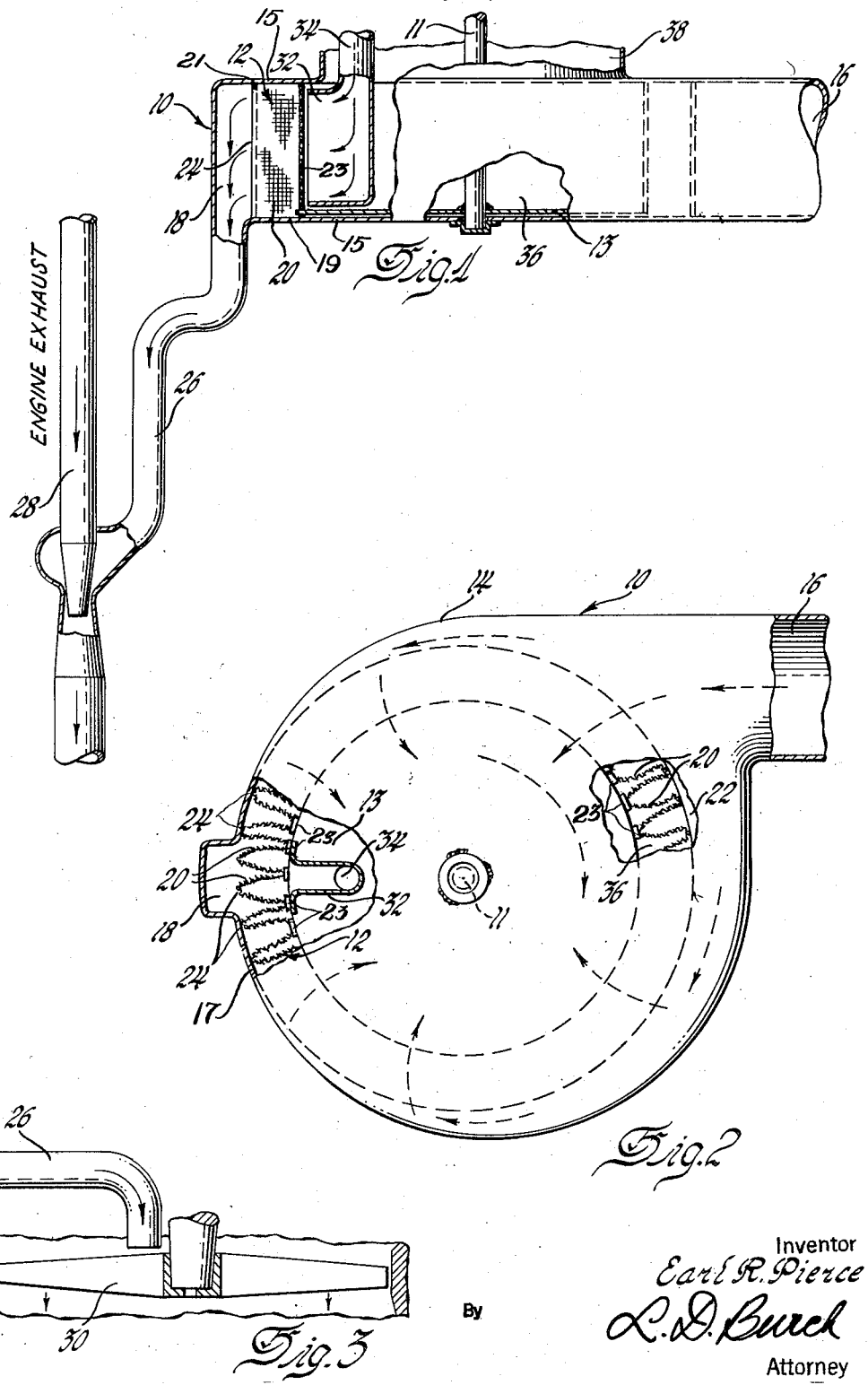

2,795,291

AIR FILTER

Earl R. Pierce, Birmingham, Mich., assignor to General Motors Corporation, Detroit, Mich., a corporation of Delaware Application July 28, 1954, Serial No. 446,265

5 Claims. (Cl. 183—61)

This invention relates to self-cleaning air filters, and more particularly to such devices in which the filtering element is pleated to increase the filtering area and to permit the expansion of the pleats by the passage of air between said pleats and in which air pressure means are disposed adjacent said pleats in a manner to enable the removal of dirt on said filter element loosened by the expansion of said pleats.

It is well recognized that the combustion air for internal combustion engines must be free of abrasive materials which would otherwise enter the engine parts and cause the excessive wear thereof. Among the various devices which have been developed for filtering such combustion air are devices in which the filter element is constructed in a manner to be self-cleaning. This self-cleaning feature is sometimes provided by an air jet for blowing the dirt from the outside of the filter element in a direction opposite to the normal passage of air through the filter element. Another method is to provide reduced or negative pressure adjacent the dirty side of the filter element to pull dirt from the outside of the filter element in vacuum cleaner fashion.

One main objection to such devices is that the filter element does not have sufficient capacity to supply the engine with the necessary amount of air. This may be due to the mere physical size of the filter element, or it may be due to the inefficiency of the self-cleaning apparatus associated therewith.

It is now proposed to provide a self-cleaning type air filter in which the filter element thereof is pleated in a manner to greatly increase the area of filter element available in an air filter of a size comparable to those presently used. The construction of the filter element is such that the passage of air between the pleats causes the pleats to flex and to expand to different extents, depending upon the amounts of air and the air pressures encountered. The proposed filter is also provided with a reduced pressure chamber adjacent the pleats along a portion of the filter element in order to reverse the flow of air through the pleats and to thus reverse the direction of expansion of the pleats. The expansion of the pleats in varying amounts constantly loosens the dirt accumulating on the outside of the filter element and enables greater quantities of air to pass through the same. At the point on the filter element disposed adjacent the reduced pressure chamber where the expansion of the pleats is reversed the dirt is further physically loosened, removed from the outside of the filter element and conducted away through the reduced pressure chamber. A positive air jet on the inside of the filter element may be provided opposite the reduced pressure chamber to increase the dirt loosening and removal action.

With the proposed construction the capacity of the air filter is greatly increased and the self-cleaning features thereof are greatly increased in efficiency. The incoming air may be substantially sealed against entry to the reduced pressure chamber, but the same air or air from another source may be applied to the inside of the filter element at a point adjacent the reduced pressure chamber to further enhance the reverse expansion of the pleats and the removal of dirt from the outside thereof.

In the drawings:

Figure 1 is a fragmentary edge view with portions thereof cut away and in cross-section of a self-cleaning air cleaner embodying the invention. Figure 1 also illustrates one manner in which a negative pressure may be provided for cleaning the filter element of the cleaner.

Figure 2 is an elevational view of the air cleaner shown by Figure 1 with portions thereof cut away to better illustrate the details of construction.

Figure 3 is a fragmentary view partly in cross-section illustrating the use of a different means to provide a negative pressure for cleaning the filter element of the cleaner shown by Figures 1 and 2.

Referring to the drawings in greater detail, an air cleaner 10 embodying the invention may comprise a cylindrical or endless belt type filter element 12 rotatably mounted, by any suitable means such as driving shaft 11, filter mounts 23 and plate 13, within a cylindrical air inlet chamber housing 14 having an air inlet duct 16 and a low pressure chamber 18 associated therewith. Housing 14 may be formed with end walls 15 and a peripheral wall 17. The edges 19 and 21 of the filter element 12 may either engage or be disposed immediately adjacent end walls 15, as shown in Fig. 1, and form seals to prevent direct communication between chambers 22 and 36 at places other than through filter element 12. The filter element 12 is formed to provide pleats 20 over the entire periphery thereof and is mounted eccentrically within the air inlet chamber 22 so that the ends 24 of the pleats 20 provide a seal between the air inlet chamber 22 and the reduced pressure chamber 18. This seal need not be absolute, but only sufficient to maintain air pressure differentials in the system. The reduced pressure chamber 18 may be connected by a suitable conduit 26 to the engine exhaust conduit 28 or the intake side of the engine fan 30 to produce a reduced pressure therein. At the inside of the filter element 12 opposite the reduced pressure chamber 18, there may be provided an air jet member 32 having above atmospheric pressure therein by connecting member 32 by a suitable conduit 34 to an air driving means. Filtered air from filtered air chamber 36 is delivered through outlet 38.

In operation, the filter element 12 is rotated by any known suitable means acting on driving shaft 11 as in the direction of the arrows so that the pleats 20 successively pass the low pressure chamber 18 and then into the air inlet chamber 22. It will be noted that while in the air inlet chamber 22 the pleats 20 are expanded in a particular direction due to the entry of air from the outside of said filter element 12. The amount of this expansion in the air inlet chamber 22 may vary due to different amounts of air under varying pressures entering the pleats 20. As any given pleat progresses around the air inlet chamber 22, dirt in the unfiltered air is accumulated thereon which dirt would, in the case of an unpleated rigid filter element, encrust itself securely to the outside surface of the filter element. However, in the case of a pleated filter element, the changing amount of expansion of the pleats causes the surface of the pleated filter element to be continuously flexed, tending to break up and loosen the crust of dirt to better permit the passage of air through the filter element and to prevent the formation of a continuous hard crust thereon. When a given pleat has completed its path through the air inlet chamber and assumes a position opposite the reduced pressure chamber, it will be noted that the pleat is expanded in a reversed direction since the air now passes in the opposite direction through the pleat from the air jet member 32 or directly from the air exit chamber 36 and into the reduced pressure chamber 18. This reversal of the direction of expansion further and more completely loosens the accumulated dirt so that the reverse passage of air may carry the same away from the outside surface of the filter element 12. As is shown in Fig. 2, the ends 24 of pleats 20 also contact the peripheral wall 17 of housing 14 and the pleats are caused to bend by this contact since the annular radius of each pleat at this point is somewhat greater in length than the distance separating cylindrically disposed filter mounts 23 from peripheral wall 17. This additional flexing of the pleats 20 further intensifies the dirt loosening actions of the pleats. Any appropriate means, such as that shown in the connection with the engine exhaust conduit 28 or the engine fan 30 may be provided for providing reduced pressure for discharging said dirt into the atmosphere, or means may be provided for collecting the same to be disposed of whenever convenient.

From the above description and drawings it is apparent that there has been provided an efficient self-cleaning air filter of increased capacity and efficiency, which air filter is an improvement over the air filter devices presently used.

What is claimed is:

1. A fluid cleaner, comprising an annular fluid chamber having end walls and an outer peripheral wall between said end walls, one of said end walls having an eccentric opening therein providing an outlet for clean fluid, an annular belt type filter element rotatably mounted eccentrically within said fluid chamber so that the edges of said filter element engage said end walls, said filter element being mounted concentrically with respect to said opening in one of said end walls, said filter element being formed in transversely extending spaced pleats and having an internal diameter such that the innermost ends of said pleats extend radially beyond the edge of said opening in one of said end walls whereby one edge of said filter element forms a continuous seal with said one end wall, the outermost edges of said pleats engaging said outer peripheral wall at one side of said chamber, means for driving said annular filter element, fluid jet means for cleaning said filter element extending through said opening in one of said end walls, and low pressure chamber means opposite said fluid jet means and on the opposite side of said filter element, said filter element thereby defining and relatively sealing an unfiltered fluid inlet chamber and a filtered fluid outlet chamber and a low pressure dirt removal chamber, and means for inducing low pressure in said chamber means.

2. An air cleaner, comprising an outer cylindrical housing having a peripheral wall and end walls and including a tangential inlet in said peripheral wall for unfiltered air and an axial outlet in one of said end walls for filtered air, an annularly disposed cylindrical filter element having edges and inner and outer peripheral surfaces and being rotatably mounted eccentrically in said housing so that said filter element edges engage the said housing end walls and so that the outer peripheral surface of said filter element engages said housing peripheral wall at the inner side thereof and is temporarily deformed thereby, and means for driving said filter element extending axially through said filter element and said housing.

3. For use with an internal combustion engine having an air intake and engine exhaust, an air cleaning and dirt removing mechanism for cleaning the engine intake air, said mechanism including a generally cylindrical air intake chamber housing having substantially parallel end walls and a peripheral wall forming an air chamber with an unfiltered air intake section, an unfiltered air inlet duct formed with said peripheral wall and providing a tangentially approaching air passage relative to said chamber, a filtered air outlet formed in one of said end walls, a rotatable annular filter element having flexible pleats with radially extending ends and mounted within said chamber on a driving shaft and adapted to be driven thereby and forming a filtered air intake chamber, a superatmospheric pressure supply conduit extending through said filtered air outlet and terminating in an air jet member positioned within said chamber intermediate said driving shaft and said filter element, said jet member extending for substantially the full width of said filter element, a subatmospheric pressure chamber formed in said housing adjacent said jet member, and means for inducing subatmospheric pressure in said last named chamber, said filter element being eccentrically and rotatably mounted in said housing whereby the edges of said element engage the end walls of said housing to form a seal between said filtered air intake chamber and said unfiltered air intake section and said filter pleat ends successively engage said housing peripheral wall adjacent said subatmospheric pressure chamber when said filter element is rotated to seal said subatmospheric chamber from said unfiltered air intake section and to flex said pleats.

4. The mechanism of claim 3 in which the means for inducing subatmospheric pressure in said subatmospheric pressure chamber includes said engine exhaust and a conduit leading from said subatmospheric pressure chamber to said exhaust to induce said subatmospheric pressure by jet pump action.

5. The mechanism of claim 3 in which the means for inducing subatmospheric pressure in said subatmospheric pressure chamber includes an engine fan and a conduit connecting said subatmospheric pressure chamber with the intake side of said fan.

References Cited in the file of this patent

UNITED STATES PATENTS

| 1,837,836 | Powell | Dec. 22, 1931 |
| 2,364,877 | Smellie | Dec. 12, 1944 |
| 2,559,428 | Hersey | July 3, 1951 |

FOREIGN PATENTS

| 148,799 | Great Britain | Oct. 10, 1921 |
| 241,419 | Germany | Dec. 1, 1911 |
| 511,455 | Great Britain | Aug. 18, 1954 |
| 650,379 | Germany | Sept. 21, 1937 |
| 914,096 | Germany | June 24, 1954 |